United States Patent [19]
McCarty

[11] Patent Number: 4,723,748
[45] Date of Patent: Feb. 9, 1988

[54] ARTICLE HOLDER

[76] Inventor: Allan McCarty, 1112 Pinehurst, Royal Oak, Mich. 48073

[21] Appl. No.: 905,882

[22] Filed: Sep. 10, 1986

[51] Int. Cl.⁴ .............................................. A47G 25/12
[52] U.S. Cl. ............................ 248/311.2; 248/218.3; 248/223.4; 211/63; 224/915; 24/351
[58] Field of Search ................... 248/309.1, 339, 309.2, 248/218.3, 218.1, 218.2, 302, 303, 316.7, 312.1, 314, 311.2, 220.4, 221.1, 231.8, 223.4; 211/63, 75, 88, 89, 106; 24/150 B, 356, 351; 224/915

[56] References Cited

U.S. PATENT DOCUMENTS

| | | | |
|---|---|---|---|
| 665,846 | 1/1901 | Alexander | 211/63 |
| 1,203,942 | 11/1916 | Walker | 248/218.3 |
| 1,281,387 | 10/1918 | Johnson . | |
| 1,518,900 | 12/1924 | Colbert . | |
| 1,694,060 | 12/1928 | Duncan . | |
| 1,843,703 | 2/1932 | Boden | 24/150 B |
| 1,899,509 | 2/1933 | Lapin | 211/88 |
| 1,904,510 | 4/1933 | Mott | 211/63 |
| 2,015,149 | 9/1935 | Krzeminski | 24/150 |
| 2,104,612 | 1/1938 | Droll | 248/218.3 |
| 2,216,479 | 10/1940 | Reiter | 24/152 |
| 2,678,127 | 5/1954 | Sinko | 24/150 B X |
| 2,697,863 | 12/1954 | Moser | 24/152 |
| 3,194,524 | 7/1965 | Trumbull | 248/74 |
| 3,239,182 | 3/1966 | Blanz | 248/223.4 |
| 3,273,769 | 9/1966 | Miller | 211/63 |
| 3,444,595 | 5/1969 | Wachenheimer | 24/73 |
| 3,502,294 | 3/1970 | Kalbov | 248/220.4 |
| 3,858,281 | 1/1975 | Larson | 24/156 R |
| 3,972,094 | 8/1976 | Fuller | 24/150 SP |
| 4,003,612 | 1/1977 | Munsell | 312/245 |
| 4,375,268 | 3/1983 | Speck | 224/42.45 R |
| 4,378,888 | 4/1983 | Reed | 211/63 |
| 4,526,333 | 7/1985 | Nakama et al. | 248/73 |
| 4,575,038 | 3/1986 | Moore | 248/316.7 |

FOREIGN PATENT DOCUMENTS 1121082   7/1956   France .............................. 248/309.1

Primary Examiner—Alvin C. Chin-Shue
Attorney, Agent, or Firm—Basile & Hanlon

[57] ABSTRACT

An article holder for mounting articles on interior surfaces of a vehicle. The article holder includes a support member shaped to conform in a releasable manner to the article. The article holder includes a mounting means which is removably insertable into a fastening member mountable in an interior fabric surface of the vehicle. The fastening member is removably insertable through the fabric on the door, headliner or carpeting or floor of the vehicle.

24 Claims, 6 Drawing Figures

ARTICLE HOLDER

BACKGROUND OF THE INVENTION

1. Field of the Invention:

This invention relates in general to article holders and, more specifically, to holders for mounting articles within the interior of a vehicle, such as an automobile and, even more specifically, to holders for mounting umbrellas within the interior of a vehicle.

2. Description of the Prior Art:

Holders for mounting various types of articles within the interior of a vehicle, such as an automobile or truck, are well known. Such holders have been devised for mounting waste containers, garage door openers, glass cases, ice scrapers, etc., at various locations within the interior of the vehicle.

Such are typically in the form of clips for mounting the article on certain components of the vehicle, such as the sun visor, door, floor, etc., or are in the form of an elongated base or platform on which the article holder can rest.

However, certain articles commonly stored within a vehicle, such as ice scrapers umbrellas, etc. have not been provided with holders which conveniently store such articles within the interior of the vehicle in a safe position. As such, it is common for such articles to be misplaced or lost.

Particularly for umbrellas, various types of holders have been devised for storing umbrellas within the interior of a vehicle. As shown in U.S. Pat. Nos. 1,694,060 and 4,378,888, separate supports are mounted within the vehicle for storing an umbrella in a convenient position on the door or behind the front seat of the vehicle. U.S. Pat. No. 4,375,268 shows an automotive vehicle bracket mountable between the trim molding and the headliner of the vehicle which is provided with hooks for retaining an elongated article, such as an circular, folded umbrella.

However, such umbrella holders require specialized connectors, such as screws, bolts, etc. which are inserted into the walls or floor of the vehicle in a permanent manner. This increases the difficulty of installing such an article holder within the vehicle and thereby detracts from its convenient use.

Thus, it would be desirable to provide an article holder for vehicles which overcomes the problems associated with the previously devised article holders mountable within vehicles. It would also be desirable to provide an article holder which can be conveniently and quickly installed in any desired position within a vehicle. Finally, it would be desirable to provide an article holder which can be configured to store a variety of objects, particularly an umbrella, in any location within the interior of a vehicle.

SUMMARY OF THE INVENTION

The present invention is an article holder for removably mounting an article, such as an umbrella, in a predetermined location within the interior of the vehicle, such as an automobile. The article holder includes a support for removably receiving the article. In a preferred use of the article holder of the present invention for storing an umbrella, the support has a tubular form with a circular cross-section. The top of the support is open to allow removable insertion of the umbrella into the support. The cross-section of the support is sized slightly smaller than the diameter of the folded umbrella to employ the resilient, outwardly extending force of the ribs of the umbrella within the support to securely and, yet, releasably retain the umbrella within the support.

The article holder also includes means for removably mounting the support on a suitable surface within the vehicle. Preferably, the mounting means comprises a fastener having first and second spaced legs and a central clip portion integrally connected therebetween. The outer ends of the first and second legs are pointed to allow sliding insertion of the fastener through various fabric surfaces within the vehicle, such as the carpeting, headliner, door fabric, etc. Once installed, the legs of the fastener extend through and behind the fabric in the vehicle, with the central clip portion being positioned on the exterior surface of the fabric. A complimentary shaped mounting engaging means is formed on the support member for sliding engagement with the clip portion of the fastener. This enables the support member to be removably attached to the fastener.

The article holder of the present invention overcomes many of the problems associated with previously devised holders for mounting articles at various locations within the interior of a vehicle, such as an automobile or truck. The article holder of the present invention can be easily and quickly attached to any suitable fabric of the door, headliner, carpeting, etc. Furthermore, the unique fastener employed in the article holder of the present invention enables secure attachment of the article to the interior vehicle surfaces without damaging such surfaces, such that the article holder can be moved to a different location, if desired, without damaging the interior fabric surfaces of the vehicle.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
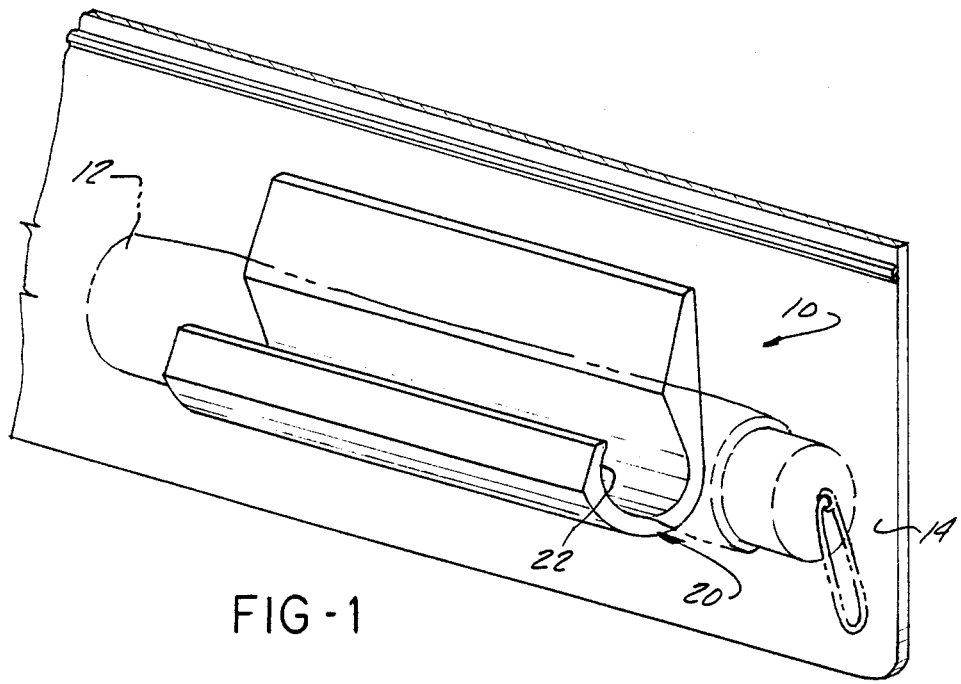
FIG. 1 is a perspective view of the article holder of the present invention mounted on the interior surface of the door of a vehicle, such as an automobile.

Throughout the following description and drawing, an identical reference number is used to refer to the same component shown in multiple figures of the drawing.

Referring now to the drawing, and in particular to FIG. 1, there is illustrated an article holder 10 designed to removably mount an article, such as an umbrella 12, on an interior surface of a vehicle, such as the interior door 14 of an automobile.

It should be understood that while the present article holder 10 is configured for holding a circular, compact umbrella 12, it may also be designed to mount any other type of article, such as glasses, garage door openers, ice scrapers, etc. On the interior surface of the door 14 of the vehicle, the headliner above the windshield, or the interior carpeting or floor of the vehicle, etc.

The article holder 10 includes of a support member 20 configured to removably receive an article, such as an umbrella 12.

Figure 2:
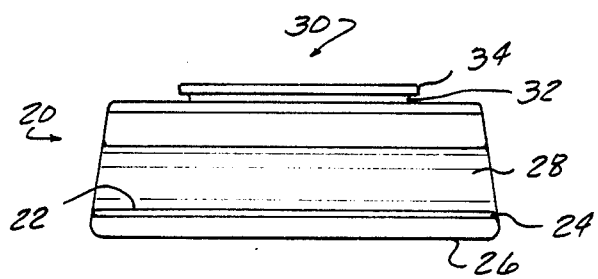
FIG. 2 is a plan view of the article support member of the article holder shown in FIG. 1.
Figure 4:
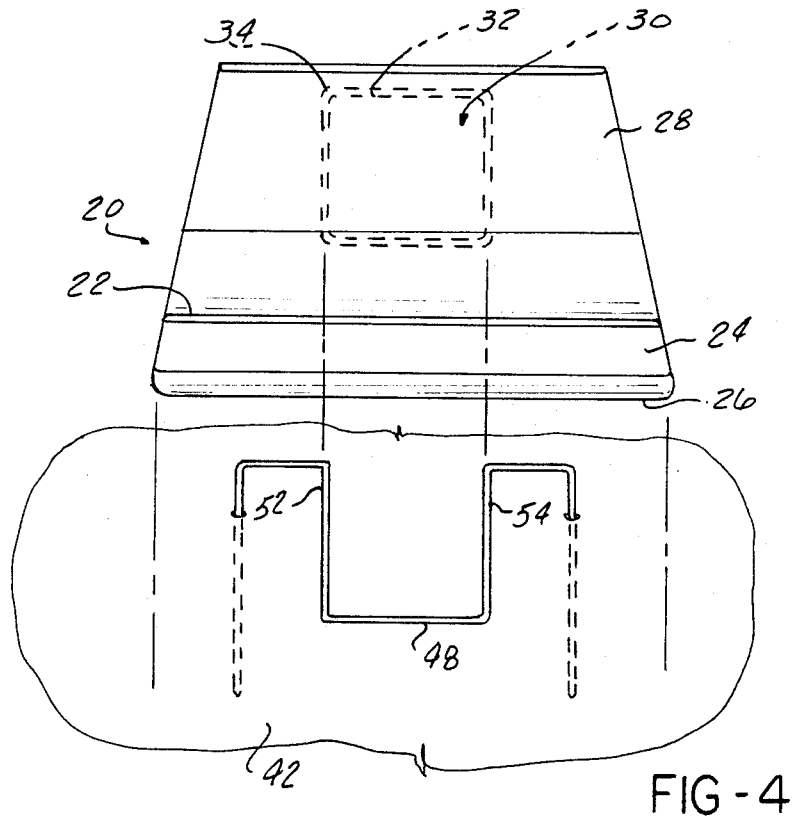
FIG. 4 is an exploded, elevational view showing the mounting of the article holder on the door of a vehicle.

The article holder 10 includes a support member 20 as shown in detail in FIG. 2 and 4. The support member 20 has a shape configured to receive any desired article. By way of example only, the support member 20 has an elongated form with a circular, cross-sectional bore 22 extending therethrough for receiving an elongated, circular-shaped umbrella 12. Other configurations may also be devised for the article holder 10 depending upon the shape of the article to be housed therein.

As shown in FIGS. 2 and 4, the support member 20 has an elongated, circular cross-sectional, longitudinally extending bore 22. The longitudinally extending bore 22 is bounding by a front wall 24, a bottom edge 26 and a back wall 28.

As shown in FIGS. 2 and 4, a fastening engaging or attachment means denoted in general by reference number 30 is mounted on the exterior surface of the back wall 28 of the support member 20. The fastening engaging means 30 comprises an inner member 32 which is integrally formed with the backwall 28 of the support member 20 and an outer enlarged cover portion 34.

Both of the inner and outer portions 32 and 34 have a generally square shape. The inner portion 32 is sized or complimentary in shape to the central clip portion 40 of a fastening member 42 shown in general in FIGS. 3 and 4. The fastening member 42 is of planar shape and formed of a resilient spring wire material. The fastener member 42 has first and second spaced legs 44 and 46 which are connected by an integrally formed central clip portion 48. The central clip portion 48 has a generally U-shaped configuration formed of a central bite portion 50, upstanding side legs 52 and 54, and upper flanges 56 and 58 which connect the central clip portion 48 to the first and second legs 44 and 46, respectively. The spacing between the legs 52 and 54 of the central clip portion 48 are sized to removably receive the inner portion 32 of the fastening member 30 therebetween.

In use, the fastening means 42 is inserted through the fabric in the vehicle by forcing the pointed or sharpened ends 60 and 62 of the first and second legs 44 and 46 of the clip 42 through the fabric in the vehicle mounting surface. This secures the fastener 42 within the vehicle mounting surface. This secures the fastener 42 within the vehicle fabric, with the central clip portion 48 extending exteriorly therefrom in a resilient orientation with respect to the surrounding fabric of the vehicle. Due to the resiliency of the spring fastener 42, the fastener mounting means 30 may be slidably urged between the central clip portion 48 of the fastener 42 and the interior fabric of the vehicle to securely retain the support member 20 in the desired position of the vehicle. In this position, the exterior portion 34 of the fastening means 30 on the support member 20 extends outward beyond the legs 52 and 54 of the central clip portion 48 to securely retain the support member 20 on the fastener 22. Yet, the support member 20 may be slidably removed from the fastener 20 and, the fastener 42 removed from the interior fabric and re-positioned as desired.

This is more clearly shown in FIG. 4 which depicts the fastener 42 in a position within the fabric of a vehicle, such as the interior door fabric. The central clip portion 48 of the fastener extends exteriorly from the vehicle door fabric. In the exploded view of FIG. 4, the support member 20 may be urged into the fastening means 30 between the legs 52 and 54 of the clip portion 48 to securely mount the support member 20 on the fastener 42 at the desired position within the interior fabric of the vehicle. This position may be the interior door surfaces, floor carpeting, headliner, or sun visor as desired.

Figures 3, 5:
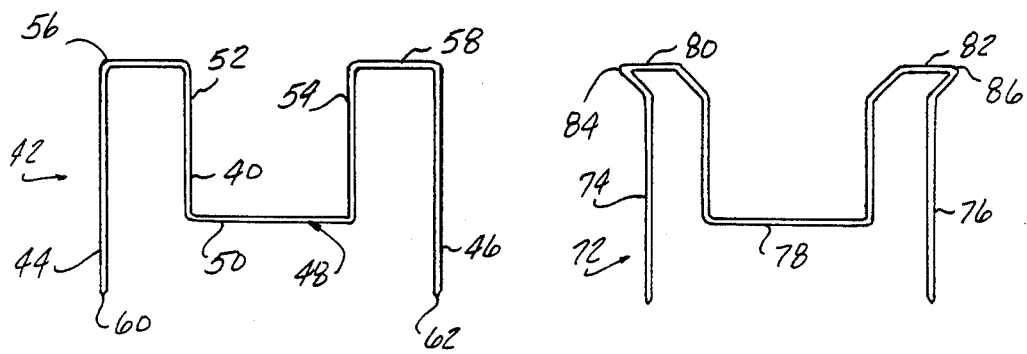
FIG. 3 is an elevational view of the fastener of the article holder shown in FIG. 1.
FIG. 5 is an exploded view of another embodiment of the fastener of the article holder of the present invention.

Referring now to FIG. 5, there is illustrated another embodiment of the fastening means used to mount the support member 20 in the vehicle. In FIG. 5, the fastening means 72 is also provided with first and second spaced legs 74 and 76, respectively. A central, depending U-shaped clip portion 78 is integrally connected between the first and second spaced legs 74 and 76. However, the upper flange portion 80 and 82 connecting the first and second legs 74 and 76, respectively, to the central clip portion 78 are formed with an angular, multi-sectional configuration rather than the square configuration shown in FIG. 3. This provides edges or lips 84 and 86 at the joinder of the upper portions of the first and second legs 74 and 76 and the flanges 80 and 82, respectively, which resists downward movement of the fastener 72 into the interior fabric of the vehicle. This insures that the fastener 72 remains in the desired position without detrimental effects on the fabric.

Figure 6:
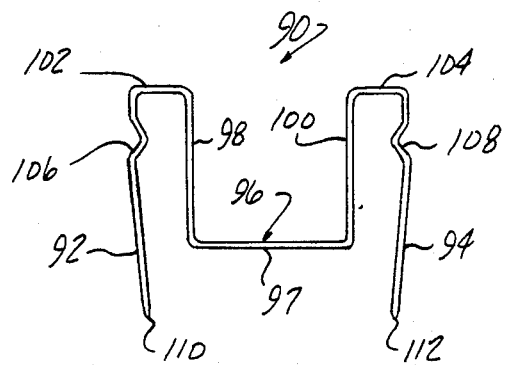
FIG. 6 is an elevational view of yet another embodiment of the present invention.

In another embodiment of the present invention, as shown in FIG. 6, the fastening engaging or attachment means 90 includes a fastening member of planar shape which is formed of a resilient spring wire material. The fastening member 90 has first and second spaced legs 92 and 94 which are connected by an integrally formed central clip portion 96. The central clip portion 96 has a generally U-shaped configuration formed with a central bite portion 97, upstanding side legs 98 and 100 and upper flanges 102 and 104 which connect the central clip portion 96 to the first and second legs 92 and 94, respectively. The spacing between the legs 92 and 94 and the central clip portion 96 are sized to removably receive the inner portion of the fastening member 40 therebetween.

In this embodiment, the side legs 92 and 94 each have an inwardly extending notch portion 106 and 108, respectively. Due to the inwardly extending angular position of the legs 82 and 94 from the upper flanges 102 and 104 with respect to the perpendicularly depending legs 98 and 100, the notch portions 106 and 108 snap into the aperture formed in the fabric to which the fastener 90 is attached thereby securely mounting the fastener 90 to the fabric. The pointed ends 110 and 112 of the legs 92 and 94, respectively, are aligned in a vertical plane with the inner portion of the notches 106 and 108, respectively. This provides the desired snap-in feature for the fastener 90 which enables it to be secured through the apertures formed in the fabric on the vehicle when the fastener 90 is mounted therein to secure the fastener 90 to the fabric.

In summary, the present invention is a unique article holder which enable an article, such as an umbrella, to be mounted within the interior of an automobile or truck in a removable manner. The article holder is easily and conveniently mountable upon any fabric surface within the vehicle, such as the fabric portions of the vehicle doors, the carpeting, or the headliner of the vehicle, by means of the fastener and clip portions of the article holder. The article holder may be formed in any convenient shape to conveniently mount any desired article, such as sunglasses, umbrellas, ice scrapers, etc. to any surface of the vehicle.

What is claimed is:

1. An article holder mountable on a support surface comprising:
   an article support member having a rear surface with a first member extending outwardly from the rear surface, said first member having an enlarged portion forming an exterior peripheral recess around the first member between the enlarged portion of the first member and the rear surface;
   a planar fastener having a central portion slidably engagable with the exterior peripheral recess of the article support member for removably mounting the article support member on the planar fastener, said planar fastener further having first and second legs connected to the central portion, said first and second legs slidably penetratable with the support surface for removably mounting the planar fastener on the support surface; and
   means, on the article support member, for securing an article.

2. The article holder of claim 1, further comprising:
   said central portion having a generally U-shaped configuration slidably engagable with the recess of the article support member to releasably mount the article support member on the planar fastener.

3. An article holder mountable on a support surface comprising:
   an article support member having a rear surface with a first member extending outwardly from the rear surface, said first member having an enlarged portion forming a recess between the enlarged portion of the first member and the rear surface;
   a planar fastener having a central portion with a generally U-shaped configuration slidably engagable with the recess of the article support member to releasably mount the article support member on the planar fastener, said planar fastener further having first and second legs connected to the central portion, each of said first and second legs having a first leg member connected to said central portion and a second leg member connected to said first leg member, said first and second leg members defining a generally L-shaped leg, said second leg member slidably engagable with the support surface to releasably mount the planar fastener on the support surface, wherein said central portion and said first and second legs define a generally M-shaped planar fastener; and
   means, on the article support member, for releasably securing an article.

4. The article holder of claim 3, further comprising:
   said second leg members having a notched portion projecting inwardly toward said central portion of said planar fastener for releasably engaging the support surface to secure the planar fastener to the support surface.

5. The article holder of claim 3, further comprising:
   each of said first and second legs having a third leg member connecting first leg member to said central portion, said third leg member forming a first obtuse angle wth respect to said central portion and forming a second obtuse angle with respect to said first leg member and a fourth leg member connecting said second leg member to said first leg member, said fourth leg member forming a first acute angle with respect to said first leg member and forming a third obtuse angle with respect to said second leg member.

6. The article holder of claim 5, further comprising:
   said second leg members having a notched portion projecting inwardly toward said central portion of said planar fastener for releasably engaging the support surface to secure the planar fastener to the support surface.

7. An article holder mountable on a support surface comprising:
   an article support member having a rear surface with a first member extending outwardly from the rear surface, said first member having an enlarged portion forming a recess between the enlarged portion of the first member and the rear surface;
   a planar fastener having a central portion slidably engagable with the recess of the article support member for removably mounting the article support member on the planar fastener, said planar fastener further having first and second legs connected to the central portion, each of said first and second legs having a first leg member connected to said central portion and a second leg member connected to said first leg member, said first and second leg members defining a generally L-shaped leg, said second leg member slidably engagable with the support surface to releasably mount the planar fastener on the support surface; and
   means, on the article support member, for releasably securing an article.

8. The article holder of claim 7, further comprising:
   said second leg members having a notched portion projecting inwardly toward said central portion of said planar fastener for releasably engaging the support surface to secure the planar fastener to the support surface.

9. The article holder of claim 7, further comprising:
   each of said first and second legs having a third leg member connecting said first leg member to said central portion, said third leg member forming a first obtuse angle with respect to said central portion and forming a second obtuse angle with respect to said first leg member, and a fourth leg member connecting said second leg member to said first leg member, said fourth leg member forming a first acute angle with respect to said first leg member and forming a third obtuse angle with respect to said second leg member.

10. The article holder of claim 9, further comprising:
    said second leg members having a notched portion projecting inwardly toward said central portion of said planar fastener for releasably engaging the support surface to secure the planar fastener to the support surface.

11. An article holder mountable on a support surface comprising:
    an article support member having a rear surface with a first member extending outwardly from the rear surface, the first member having an enlarged portion forming a recess between the enlarged portion and the rear surface;
    a planar fastener engagable with the recess of the article support member for removably mounting the article support member on the planar fastener, the planar fastener including:

a complimenary-shaped central portion engagable with a substantial portion of the recess of the article support member;

first and second legs connected at opposing ends of the central portion, each of said first and second legs having a first leg member connected to the central portion and a second leg member connected to the first leg member, the first and second leg members defining a generally L-shaped leg, the second leg member slidably engagable with the support surface to releasably mount the planar fastener on the support surface; and means, on the article support member, for releasably securing an article.

12. The article holder of claim 11, further comprising:
the second leg members of the first and second legs having a notched portion projecting inwardly toward the central portion of the planar fastener terminating in notch ends to snap into the support surface to releasably and securely mount the planar fastener.

13. The article holder of claim 11, wherein the means for securing an article further comprises:
the article support member having an elongated, longitudinally extending, semi-cylindrically shaped surface with a smaller cross-sectional diameter than the article for resiliently and removably holding the article on the article support member.

14. The article holder of claim 11, further comprising:
the central portion having a generally U-shaped configuration slidably engagable with a substantial portion of the recess of the article support member for removably engaging the article support member on the planar fastener.

15. The article holder of claim 14, further comprising:
the second leg members of the first and second legs having a notched portion projecting inwardly toward the central portion of the planar fastener terminating in notch ends to snap into the support surface to releasably and securely mount the planar fastener.

16. The article holder of claim 14, further comprising:
each of the first and second legs having a third leg member connecting the first leg member to the central portion, the third leg member forming a first obtuse angle with respect to the central portion and forming a second obtuse angle with respect to the first leg member.

17. The article holder of claim 16, further comprising:
the second leg members of the first and second legs having a notched portion projecting inwardly toward the central portion of the planar fastener terminating in notch ends to snap into the support surface to releasably and securely mount the planar fastner.

18. The article holder of claim 16, further comprising:
each of the first and second legs having a fourth leg member connecting the second leg member to the first leg member, the fourth leg member forming an acute angle with resepct to the first leg member and forming a third obtuse angle with respect to the second leg member.

19. The article holder of claim 18, further comprising:
the second leg members of the first and second legs having a notched portion projecting inwardly toward the central portion of the planar fastener terminating in notch ends to snap into the support surface to releasably and securely mount the planar fastener.

20. The article holder of claim 11, further comprising:
each of the first and second legs having a third leg member connecting the first leg member to the central portion, the third leg member forming a first obtuse angle with respect to the central portion and forming a second obtuse angle with respect to the first leg member.

21. The article holder of claim 20, further comprising:
the second leg members of the first and second legs having a notched portion projecting inwardly towad the central portion of the planar fastener terminating in notch ends to snap into the support surface to releasably and securely mount the planar fastener.

22. The article holder of claim 20, further comprising:
each of the first and second legs having a fourth leg member connecting the second leg member to the first leg member, the fourth leg member forming an acute angle with respect to the first leg member and forming a third obtuse angle with respect to the second leg member.

23. The article holder of any one of claim 22, further comprising:
the second leg members of the first and second legs having a notched portion projecting inwardly toward the central portion of the planar fastener terminating in notch ends to snap into the support surface to releasably and securely mount the planar fastener.

24. An umbrella holder mountable to an interior surface of vehicle comprising:
an article support member having a rear surface with a first member extending outwardly from the rear surface, the first member having an enlarged portion forming a recess between the enlarged portion, the first member, and the rear surface, the article support member further having an elongated, longitudinally extending, semi-cylindrically shaped surface with a smaller cross-sectional diameter than an umbrella for resiliently and removably holding the umbrella on the article support member;

a planar fastener engagable with the recess of the article support member for removably mounting the article support member on the planar fastener, the planar fastener including:

a complimentary-shaped central portion engagable with a substantial portion of the recess of the article support member;

first and second legs connected at opposing ends of the central portion, each of the first and second legs having a first leg member connected to the central portion and a second leg member connected to the first leg member, the first and second leg members defining a generally L-shaped leg, the second leg member slidably engagable with the support surface to releasably mount the planar fastener on the interior surface, wherein the central portion in the first and second legs define a generally M-shaped planar fastener;

each of the second leg members of the first and second legs having a notched portion projecting inwardly toward the central portion of the planar fastener terminating in notch ends for snap-in engagement with the interior surface to securely and releasably mount the planar fastener on the interior surface.

* * * * *